(12) United States Patent
Janke

(10) Patent No.: US 11,877,656 B1
(45) Date of Patent: *Jan. 23, 2024

(54) FURNITURE ARTICLE WITH INTERCHANGEABLE PANEL SET

(71) Applicant: Ashley Furniture Industries, LLC, Arcadia, WI (US)

(72) Inventor: Harry Janke, Trempealeau, WI (US)

(73) Assignee: Ashley Furniture Industries, Inc., Arcadia, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,274

(22) Filed: Jul. 27, 2021

Related U.S. Application Data

(63) Continuation of application No. 16/877,949, filed on May 19, 2020, now Pat. No. 11,071,383, which is a (Continued)

(51) Int. Cl.
*A47B 95/04* (2006.01)
*F16B 35/06* (2006.01)
(Continued)

(52) U.S. Cl.
CPC ............ *A47B 95/04* (2013.01); *A47B 88/956* (2017.01); *F16B 35/06* (2013.01); *A47B 96/206* (2013.01); *A47B 2088/952* (2017.01); *A47B 2096/207* (2013.01); *A47C 19/022* (2013.01); *Y10T 29/49826* (2015.01); *Y10T 29/49963* (2015.01);
(Continued)

(58) Field of Classification Search
CPC ........ A47B 2096/207; A47B 2088/952; Y10T 428/24008
See application file for complete search history.

(56) References Cited

U.S. PATENT DOCUMENTS 3,589,788 A  6/1971  Kaiden
3,936,107 A  2/1976  Gourdeau et al.
(Continued)

OTHER PUBLICATIONS

Signature Design Furniture, Alexander Collection, http://www.steelesfurniture.com/furniture/kids-furniture/dressers/alexander-dresser/, Aug. 5, 2014, 1 page.
(Continued)

*Primary Examiner* — Jasper Saberi
(74) *Attorney, Agent, or Firm* — Christensen, Fonder, Dardi & Herbert PLLC

(57) ABSTRACT

Furniture, such as a bed, dresser, cabinetry has a display system affixing a stack of interchangeable decorative panels to the furniture. The display system has an overlaying panelar frame that captures the stack of panels and has at least one elongated fastener securing the overlaying panelar frame on to a surface of the furniture item. The stack of interchangeable panels are each visually different such as having different colors and/or patterns and can be sandwiched between the overlaying panelar frame and the mounting surface in a pocket to immovably maintain the interchangeable panels against the furniture component. The stack of interchangeable panels can be rearranged such that a different panel is placed on top of the stack or the outermost position and thereby be visible through the opening in the overlaying panelar frame.

17 Claims, 6 Drawing Sheets

Related U.S. Application Data continuation of application No. 15/996,063, filed on Jun. 1, 2018, now Pat. No. 10,653,241, which is a continuation of application No. 13/804,262, filed on Mar. 14, 2013, now abandoned.

(60) Provisional application No. 61/659,277, filed on Jun. 13, 2012.

(51) Int. Cl.
    *A47B 88/956*    (2017.01)
    *A47B 96/20*     (2006.01)
    *A47C 19/02*     (2006.01)
    *A47B 88/95*     (2017.01)

(52) U.S. Cl.
    CPC .............. *Y10T 428/24008* (2015.01); *Y10T 428/24025* (2015.01)

(56) References Cited

U.S. PATENT DOCUMENTS

| | | | |
|---|---|---|---|
| 4,296,866 A | 10/1981 | Learnard | |
| 4,732,431 A | 3/1988 | Mason | |
| 4,987,713 A | 1/1991 | Delafield | |
| 5,081,777 A | 1/1992 | Kim | |
| 5,987,794 A | 11/1999 | Lavi et al. | |
| 6,543,071 B1 | 4/2003 | Lenner | |
| D474,053 S | 5/2003 | Lenger | |
| 6,658,677 B2 | 12/2003 | Paul | |
| 6,948,788 B1 * | 9/2005 | Tai | A47B 88/956 312/348.4 |
| 7,165,749 B2 | 1/2007 | Venezia | |
| 7,862,436 B2 | 1/2011 | Cole | |
| 2003/0110592 A1 | 6/2003 | Yeh | |
| 2003/0145377 A1 | 8/2003 | Paul | |
| 2007/0000195 A1 | 1/2007 | Garces et al. | |
| 2009/0153006 A1 | 6/2009 | Hazzard et al. | |
| 2009/0288253 A1 | 11/2009 | Jin | |
| 2010/0300003 A1 | 12/2010 | Goode | |
| 2012/0169192 A1 | 7/2012 | Simon | |

OTHER PUBLICATIONS

Opus Designs By Hooker Furniture, Lily Youth Bedroom Collection, http://www.opusdesigns.com/index.cfm/kids/kids-furniture.show-detail-forever-young/teen-furniture/1508-46161/six-drawer-chest, Aug. 5, 2014, 1 page.

Blink Manufacturing, Shadowbox Vertical Wall Mount Mailboxes, http://www.blinkmanufacturing.com/product.php?productid=169&cat=0&page=2, Aug. 5, 2014, 2 pages.

Thomasville Cabinetry, Custom Accents by Thomasville Cabinetry, Cabinet Custom Insert Panels, http://www.thomasvillecabinetry.com/Cabinet-Accessories.aspx, Aug. 5, 2014, 10 pages.

* cited by examiner

FURNITURE ARTICLE WITH INTERCHANGEABLE PANEL SET

RELATED APPLICATIONS

This application is a continuation of U.S. patent application Ser. No. 16/877,949, filed May 19, 2020, now U.S. Pat. No. 11,071,383, which is a continuation of U.S. patent application Ser. No. 15/996,063, filed Jun. 1, 2018, now U.S. Pat. No. 10,653,241, which is a continuation of U.S. patent application Ser. No. 13/804,262, filed on Mar. 14, 2013, which claims the benefit of U.S. Provisional Patent Application No. 61/659,277, filed on Jun. 13, 2012, the disclosures of which are hereby incorporated by reference in their entirety.

FIELD OF THE INVENTION

The present invention is generally directed to a display system for positioning panels on furniture item components to provide a desired aesthetic appearance to the furniture item. More specifically, the present invention is directed to a display system for releasably positioning interchangeable panels that can be exchanged to change the aesthetic appearance of the furniture item.

BACKGROUND OF THE INVENTION

Furniture is often selected as much for the aesthetic appearance of the furniture item as the intended function of the furniture item. As such, consumers often devote considerable attention to whether the appearance and color of the furniture item matches the decor of the intended room for the furniture item and the other furniture or other items in the room. Similarly, consumers often move or replace a furniture item if the decor in the room or the consumer's taste changes. In particular, children often have distinctive and constantly changing tastes that can result in a furniture item being deemed "unsuitable" even while the furniture item is still fully functional.

A primary factor in the aesthetic appearance of a furniture item is the color and design of the exterior surfaces of furniture items. In particular, the color and general design or appearance of the headboard, footboard, the face of drawers, the cabinet doors and other portions of the furniture item that make up a substantial portion of the overall exterior surface of the furniture item can dramatically affect the overall appearance of the furniture item. As a result, certain furniture items comprise interchangeable panels integrated into various exterior furniture components. These can comprise beds, dressers, cabinets, night stands and the like. The interchangeable panels have different aesthetic appearances such that the panels can be swapped with panels to suit the consumer's changing tastes or decor. The inherent challenge of interchangeable panels is releasably engaging the panels by the furniture components and not having the attachment system be visible and obvious, such as openings cut into drawers for sliding the panels. Interchangeable panels can be integrated into furniture components by positioning the panel against the frame of the furniture component such that the panel can be viewed through the opening in the frame such as disclosed in U.S. Pat. No. 6,543,071. A backing is then placed against the rear of the interchangeable panel and attached to the frame to maintain the interchangeable panel against the frame. A drawback of this approach is that interchangeable panels are often relatively thin or even flexible requiring that the backing provide the necessary structural support. Alternatively, the slot for receiving the interchangeable panel can be cut in the frame allowing panels to be slid into the frame such as disclosed in U.S. Pat. No. 6,658,677. In this configuration, the frame often comprises a door or gate for maintaining the panel within the slot.

A common drawback of the presently available systems for affixing interchangeable panels to a furniture item is that the frame of the furniture item must typically be modified or be specially constructed for receiving the interchangeable panel. As the current trends in furniture construction emphasize efficient construction where a single part may be used in several furniture item lines, a specially constructed or modified furniture component may form a bottleneck in the overall assembly of the furniture item. As such, there is a need for an efficient means of releasably integrating interchangeable panels into a furniture item.

SUMMARY OF THE INVENTION

The present invention is directed to furniture with a display system affixing a stack of interchangeable decorative panels to the piece of furniture. In one embodiment of the present invention, the display system comprises an overlaying panelar frame that captures the stack of panels and has at least one elongated fastener securing the overlaying panelar frame on to a surface of the furniture item. The stack of interchangeable panels have each visually different such as having different colors and/or patterns and can be sandwiched between the overlaying panelar frame and the mounting surface to maintain the interchangeable panels against the furniture component. The overlaying panelar frame defines at least one opening or widow through which the outermost interchangeable panel is visible. The stack of interchangeable panels can then be rearranged such that a different panel is placed on top of the stack or the outermost position and thereby be visible through the opening in the overlaying panelar frame.

In one aspect, the elongated fastener is extended through the overlaying panelar frame and the interchangeable panels by way of holes in the interchangeable panels and into the mounting surface to affix the overlay panelar frame and interchangeable panels to the mounting surface. In this configuration, the elongated fastener can further comprise an integrated handle protruding from the overlaying panelar frame for tool-less operation of the fastener to engage or disengage the overlaying panelar frame from the mounting surface. The integrated handle can be shaped and/or colored to match the overlaying panelar frame such that the handle matches or blends into the aesthetic appearance of the overlaying panelar frame when the fastener is inserted to retain the overlaying panelar frame against the mounting surface or the secondary panel. The integrated handle can also serve as the handle for manipulating furniture components such as drawers or cabinet doors.

In another aspect, the fastener can be threaded from a secondary panel having a mounting surface to which the stack of panels are to be mounted. The fastener, such as a bolt, extends through the secondary panel, through the stack of interchangeable panels, and through the overlaying panelar frame such that a portion of the elongated fasteners protrudes from the overlaying panelar frame. In this configuration, the fastener can further comprise an end cap defining a bore hole or threaded hole into which the fastener can be threaded into affix the overlaying panelar frame onto the secondary panel. As with integrated handle, the end cap can be shaped and/or colored to match the overlaying panelar frame such that the handle matches or blends into the aesthetic appearance of the overlaying panelar frame when the fastener is inserted to retain the overlaying panelar frame against the mounting surface or the secondary panel. In one aspect, the end cap can also serve as the handle for manipulating furniture components such as drawers or cabinets. In another aspect, the end cap can serve to conceal the end of the elongated fasteners and blend the end of the fastener into the aesthetic appearance of the overlay panel.

In one aspect, the overlaying panelar frame can comprise a primary frame defining a primary opening and a secondary structure positioned within the primary opening. The secondary structure can further comprise at least one ornamental frame portion defining at least one secondary opening within the primary opening. A picture or other printed image can be positioned beneath the ornamental frame portion such that the frame portion engages and frames the picture or printed image and to retain the picture or printed image within the ornamental frame portion. In this configuration, the consumer can further customize the aesthetic appearance by incorporating pictures or printed images into the overall aesthetic appearance of the furniture component.

According to an embodiment of the present invention, a method of releasably affixing at least one interchangeable panel to a mounting surface comprises providing an overlaying panelar frame defining at least one opening, the overlaying panelar frame having four frame member portions arranged in a rectangle and each having an inwardly elongate recess that is positioned at the mounting surface when the frame is attached to the furniture item, the collective recesses on the frame members defining a capture recess for securing the stack of panels, and further having at least one elongated fastener to secure the assembly together. The method further comprises positioning the interchangeable panel against the mounting surface and positioning the overlaying panelar frame over the interchangeable panel to sandwich the interchangeable panel between the overlaying panelar frame and the surface of the furniture component. The method also comprises extending the fastener through the overlaying panelar frame and interchangeable panels such that the end of the fastener passes through the mounting surface into the substrate therebelow to affix the overlaying panelar frame to the mounting surface, wherein the outermost interchangeable panel is visible through the opening. The visible panel can be switched by removing the fastener, separating the overlaying panelar frame from the mounting surface, reshuffling the stack of decorative panels, and replacing the overlaying panelar frame with the stack of decorative panels again between the overlying panelar frame and the mounting surface and attaching the fastener.

In one aspect, the mounting surface can comprise a planar surface of a furniture component. In yet another aspect, the mounting surface can comprise a secondary panel to form a modular display system for the interchangeable panels. In this configuration, the method further comprises affixing the secondary panel to a planar surface of a furniture component.

In one aspect, a plurality of interchangeable panels can be positioned between the overlaying panelar frame and the mounting surface. In this configuration, the method can further comprise stacking the plurality of interchangeable panels such that the outermost interchangeable panel is visible through the opening in the overlay panel. The method further comprises securing the frame to the mounting surface. The method also comprises shuffling the plurality of interchangeable panels to change the outermost interchangeable panel.

A feature and advantage is that there are not visible means of seeing that a stack of interchangeable panels is stored within the display system. That is there are no slots or the like and only the outermost panel is visible. Additionally, the mechanism to disassemble and switch the exposed panel is simply the removal of the knob in embodiments, removal of the exterior panel and reshuffling the stack and replacing the panel and knob.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

Figure 1:
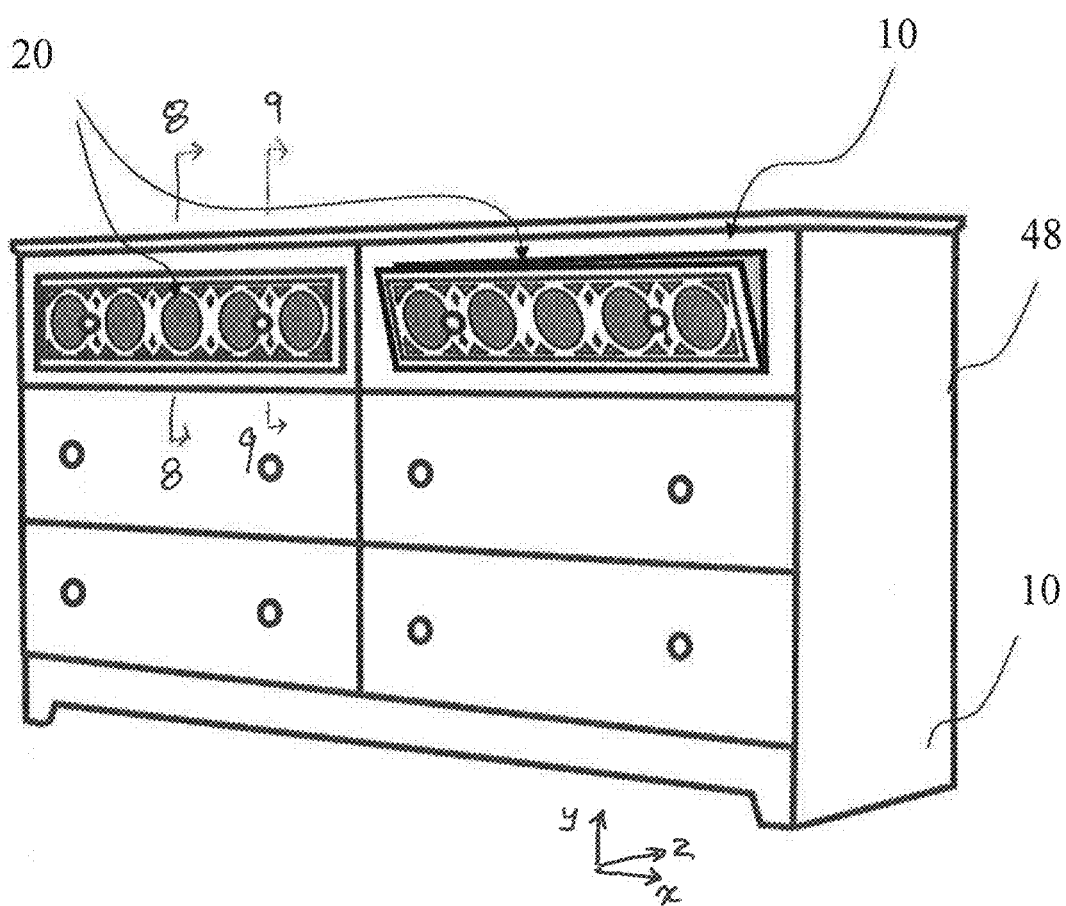
FIG. 1 is a perspective view of a display system mounting to a furniture item according to an embodiment of the present invention.
Figure 2:
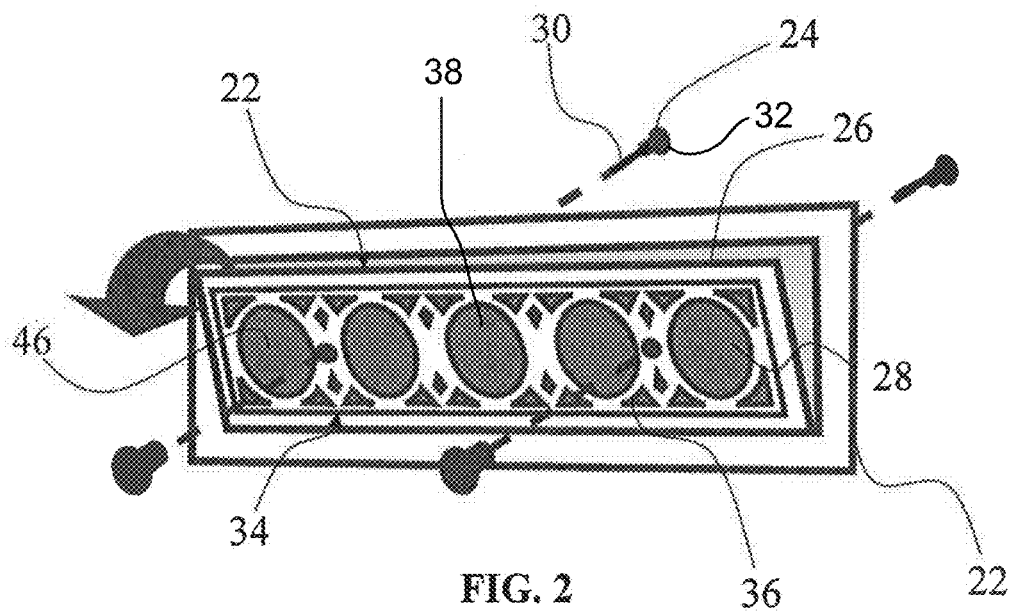
FIG. 2 is a perspective view of a display system during assembly according to an embodiment of the present invention.

While the invention is amenable to various modifications and alternative forms, specifics thereof have been shown by way of example in the drawings and will be described in detail. It should be understood, however, that the intention is not to limit the invention to the particular

DETAILED DESCRIPTION

As shown in FIGS. 1-5, a piece of furniture 10, such as a dresser, has a display system 20, and according to an embodiment of the present invention, comprises an overlaying panelar frame 22 and at least one elongated fastener 24. The overlaying panelar frame 22 further comprises a primary frame 26 defining a primary opening 28. As depicted, the primary frame 26 comprises a generally rectangular shape with a rectangular opening. The primary frame 26 can also comprise any conventional polygonal, circular or elliptical shape, wherein the primary opening 28 can have a matching or different shape. The elongated fastener 24 can comprise a threaded shank 30 and a head 32 for rotating the shank 30.

Figure 3:
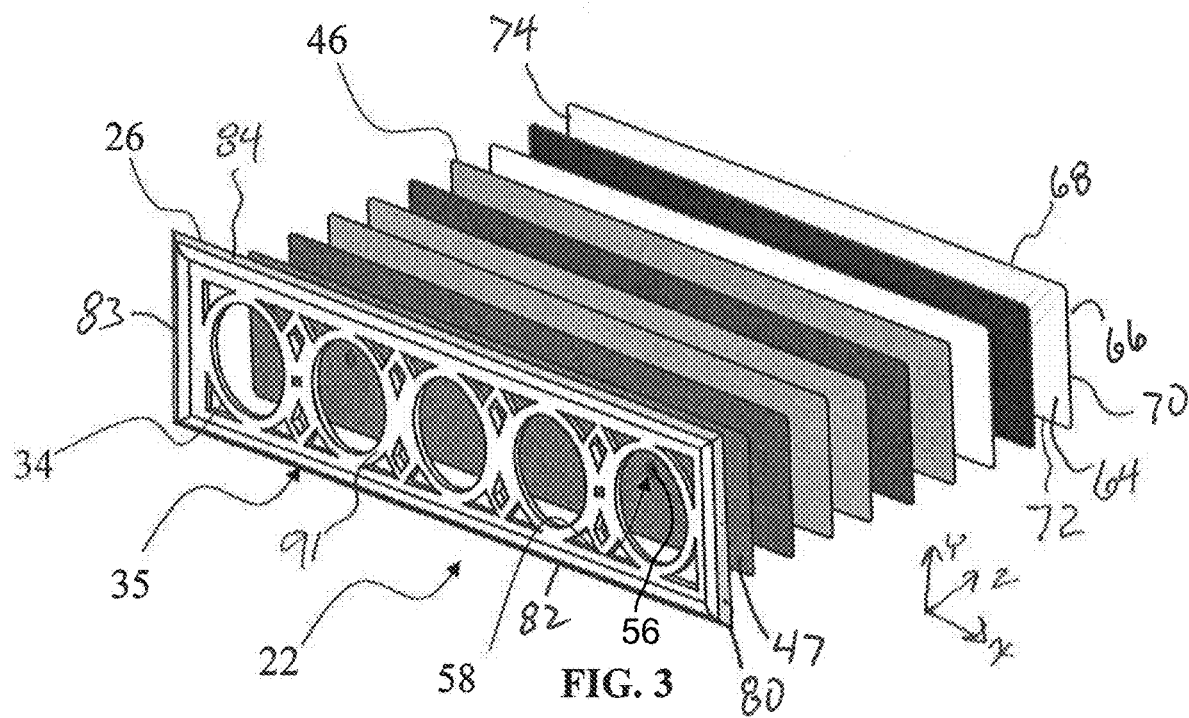
FIG. 3 is a perspective exploded view of a display system according to an embodiment of the present invention.
Figure 4:
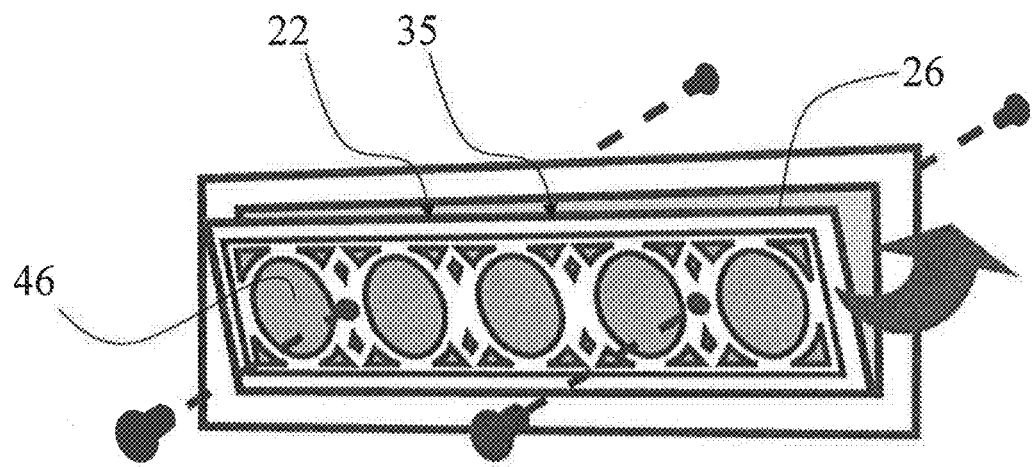
FIG. 4 is a perspective view of a display system during assembly according to an embodiment of the present invention.

As shown in FIGS. 1-5, in one aspect, the overlaying panelar frame 22 can further comprise a secondary structure 34 configured as ornamental frame portions positioned within the primary opening 28 defined by the primary frame 26. The primary frame has four frame members 35. In one aspect, the secondary structure 34 can comprise a lattice structure for presenting a particular pattern within the primary frame 26. The secondary structure 34 can be affixed or integral to the primary frame 26 as shown in FIG. 3 or a separate component that can be separated from the primary frame 26. In one aspect, the secondary structure 34 can further comprise at least one ornamental frame portion 36 each defining a secondary opening 38 within the larger primary opening 28.

With reference to FIGS. 2, 4-8, in one aspect, the elongated fastener 24 can further comprise a handle fitted over the head 32 for gripping and rotating the shank 30. The handle allows for tool-less operation of the elongated fastener 24. In another aspect, the elongated fastener 24 can comprise an end cap defining a threaded bore hole for engaging the end of the shank 30. In this configuration, the shank 30 is threaded from the opposite side of the display system 20. The handle and the end cap can be colored and shaped to match the aesthetic appearance of the overlaying panelar frame 22. The handle and end cap can be configured to serve as handles for certain furniture components such as drawers or cabinet doors.

Figure 5:
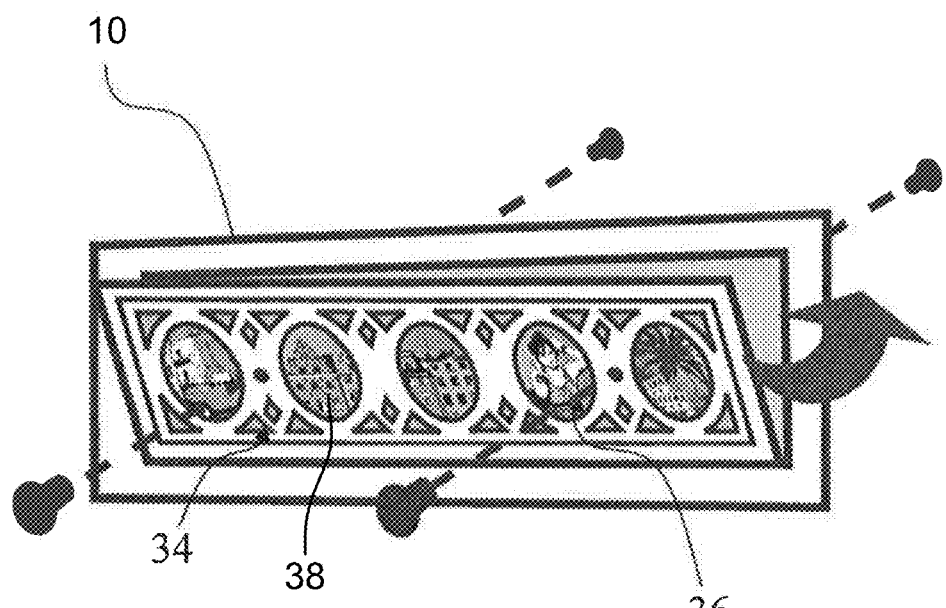
FIG. 5 is a perspective view of a display system during assembly according to an embodiment of the present invention having images positioned within the display system.
Figure 6:
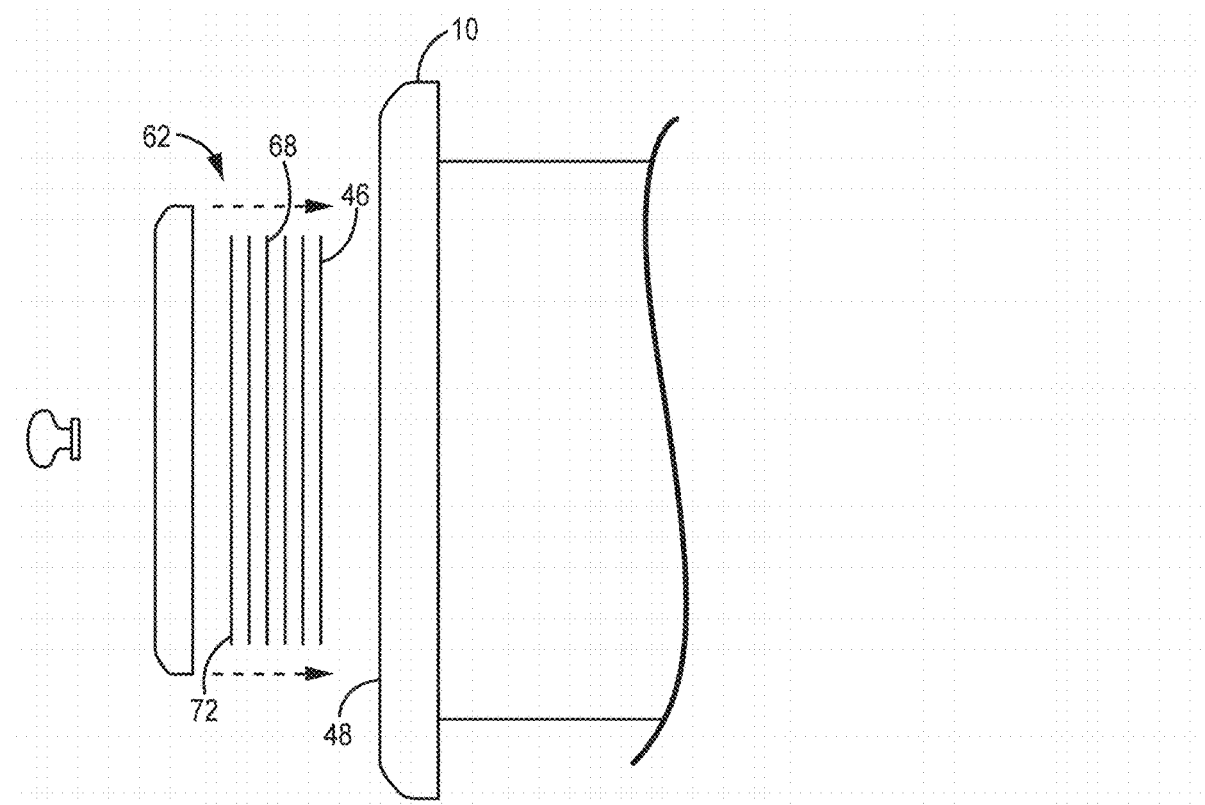
FIG. 6 is an exploded elevational view of an embodiment of the invention in the context of a piece of furniture with a drawer.

As shown in FIGS. 1-5, in operation, the overlaying panelar frame 22 is releasably affixed to a mounting surface by threading the fastener 24 through the overlaying panelar frame 22 and into the mounting surface. In an embodiment of the present invention, the overlaying panelar frame 22 and the secondary structure 34 are integrated such that the integrated overlay panel-secondary structure assembly 22, 34 are affixed to the mounting surface as a single unit. In another embodiment, the secondary structure 34 is separately affixed to the mounting surface. The fastener 24 can be removed to separate the overlaying panelar frame 22 from the mounting surface. At least one interchangeable panel 46 can be positioned between the overlaying panelar frame 22 and the mounting surface such that the interchangeable panel 46 is sandwiched between the overlaying panelar frame 22 and the mounting surface to maintain the interchangeable panel 46 against the mounting surface. The interchangeable panel 46 is visible through the primary opening 28 to affect the aesthetic appearance of the mounting surface. As shown in FIG. 5, a picture or a printed image can be placed beneath the secondary structure 34 such that the ornamental frame portion 36 engages the edge of the picture or printed image to retain the picture or printed image such that the picture or printed image is visible through the secondary opening 38.

As shown in FIGS. 3-7, in one embodiment, the primary frame 26 can capture and engage the edges of the interchangeable panels 46 to maintain the interchangeable panels 46 against the mounting surface. In this configuration, the secondary structure 34 can serve as a retention structure aiding the primary frame 26 in maintaining the panels 46 against the mounting surface. Alternatively, the primary frame 26 and the secondary structure 34 can be separately affixed to the mounting surface, wherein the primary frame 26 cooperates with the mounting surface to define a slot for receiving the interchangeable panels 46. In this configuration, the secondary structure 34 is then placed over the interchangeable panels 46 and separately affixed to the mounting surface to maintain the interchangeable panels 46 within the slot defined by the primary frame 26.

In one embodiment shown in FIG. 1, the mounting surface can comprise a planar surface 48 of a furniture component 10. As depicted, the furniture component can comprises headboard, but can also include any furniture component with a planar surface such as a footboard, drawer, or cabinet. The description of the furniture component 10 is not intended to be limiting, but to aid in the description of the display system 20.

In another embodiment, the mounting surface can comprise a secondary panel that can be engaged to furniture component 10. Mounting the display system 20 to the secondary panel rather than directed to the furniture component 10 permits the display system 20 to be installed as a pre-assembled modular component on the assembled furniture item.

The interchangeable panels 46 can be arranged in a stack such that only the top most interchangeable panel 46 is visible through the primary opening 28. In one aspect, the interchangeable panels 46 can comprise a thin polymeric material that can be colored or to which a pattern can be applied. A transparent panel can be placed above the topmost interchangeable panels 46 to prevent discoloration of or damage to the interchangeable panels 46.

In one embodiment, each interchangeable panel 46 can define at least one bore hole 56 corresponding to each fastener 24. In this configuration, the fastener 24 can intersect each bore hole 56 when inserted through the overlaying panelar frame 22 to prevent radial movement of the interchangeable panels 46 relative to the fastener 24. In one aspect, a plurality of flexible fingers 58 can be positioned around each bore hole 56 to engage the fastener 24 to prevent tearing of the bore hole 56 by the threaded shank 30 of the fastener 24. In this configuration, the elongated fastener 24 can further comprise a spacer for preventing axial movement of the interchangeable panels 46 along the shank 30 to prevent tearing of the bore hole 56 by the threaded shank 30.

According to an embodiment of the present invention, a method of releasably affixing at least one interchangeable panel 46 to a mounting surface comprises providing an overlaying panelar frame 22 defining at least one primary opening 28 and at least one elongated fastener 24. The method further comprises positioning the interchangeable panel 46 against the mounting surface and positioning the overlaying panelar frame 22 over the interchangeable panel 46 to sandwich the interchangeable panel 46 between the overlaying panelar frame 22 and mounting surface. The method also comprises threading the fastener 24 through the overlaying panelar frame 22 and interchangeable panels 46 such that the end of the fastener engages the mounting surface to affix the overlaying panelar frame 22 to the mounting surface, wherein the interchangeable panel 46 is visible through the primary opening 28.

In one aspect, the mounting surface can comprise a planar surface 48 of a furniture component 10. In yet another aspect, the mounting surface can comprise a secondary panel to form a modular display system 20 for the interchangeable panels 46. In this configuration, the method further comprises affixing the secondary panel to a planar surface 48 of a furniture component 10, which is a dresser with a drawer.

In one aspect, a plurality of interchangeable panels 46 can be positioned between the overlaying planar frame 22 and the mounting surface. In this configuration, the method can further comprise stacking the plurality of interchangeable panels 46 such that the outermost interchangeable panel 46 is visible through the primary opening 28 in the overlaying panelar frame 22. The method also comprises shuffling the plurality of interchangeable panels 46 to change the outermost interchangeable panel 47.

Figure 7:
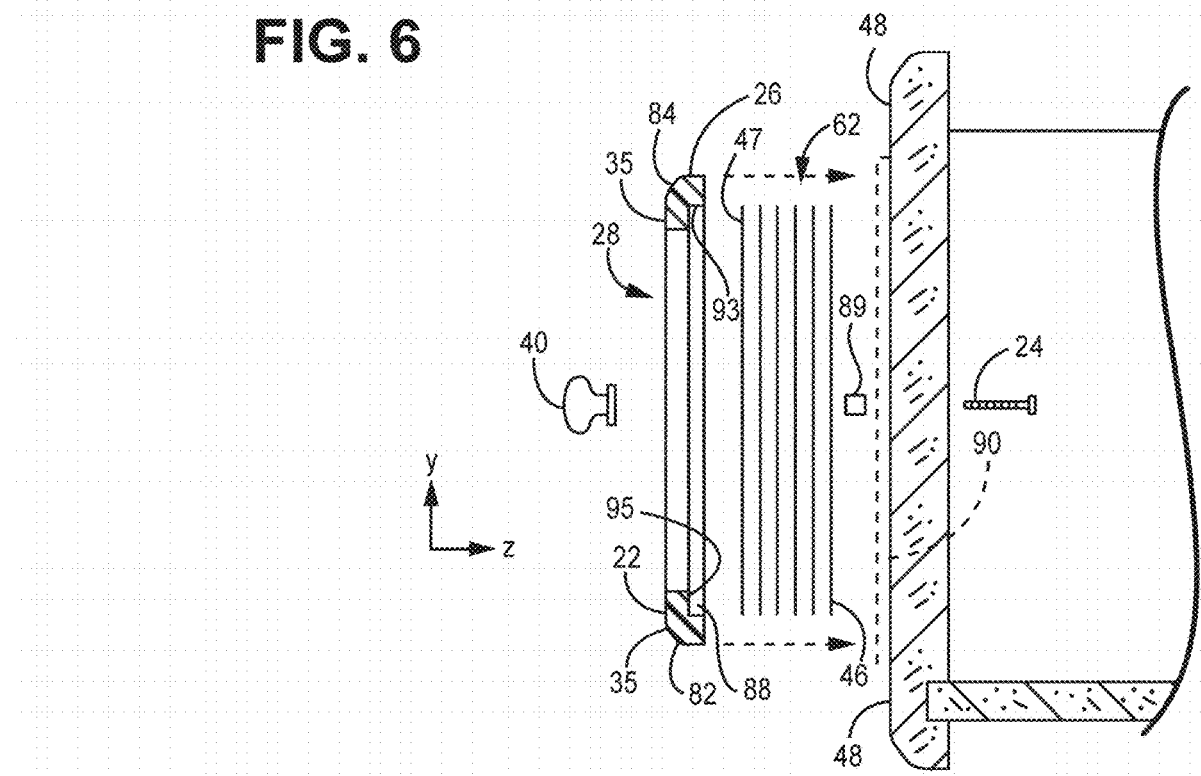
FIG. 7 is an exploded elevational cross sectional view of an embodiment of the invention in the context of a piece of furniture with a drawer.

Referring to FIGS. 3 and 7, each interchangeable panel 46, in the stack 62, has opposing sides 64, 66, and four side edges 68, 70, 72, 74. The overlaying panelar frame 22 has four frame members 80, 82, 83, and 84. Each frame member may have a recess 88 having two surfaces 93, 95 formed therein to face the mounting surface 48. The recesses, in combination, capture all four side edges 68, 70, 72, 74 of the all of the decorative interchangeable panels. The recesses 88, the planar mounting surface 48, and the framework or lattice work 91 define a pocket 100 for retaining the stack of panels. The panels are retained by the peripheral inwardly facing surfaces 93, as well as being physically pinched or constrained between the surface 48 and the inwardly, toward the door, surface 95 of the overlaying panelar frame, and by the fastener, the screw positioned in the hole of the panels in the stack.

FIG. 7 illustrates by way of the dashed lines 90 that an intermediary frame member can be positioned between the overlaying panelar frame and the planar mounting surface 48. Said member can have a recess corresponding to the shape and depth of the stack or a partial thickness of the stack if the outer panel, the overlaying panelar frame member receives a portion of the thickness of the stack. A spacer 89 can securely position the individual decorative panel in the stack by matching or being slightly oversized to the aperture extending through the panels.

As an example, the panels may be in an embodiment .015 to .025 inches thick, and have a length of 14 to 24 inches, and a height of 3.5 to 7 inches, and a surface area of one side, the front or the back, of 40 to 200 square inches. The stack can, in embodiments, have a thickness of .125 to .325 inches. Obviously, different thicknesses may be utilized.

Figure 8:
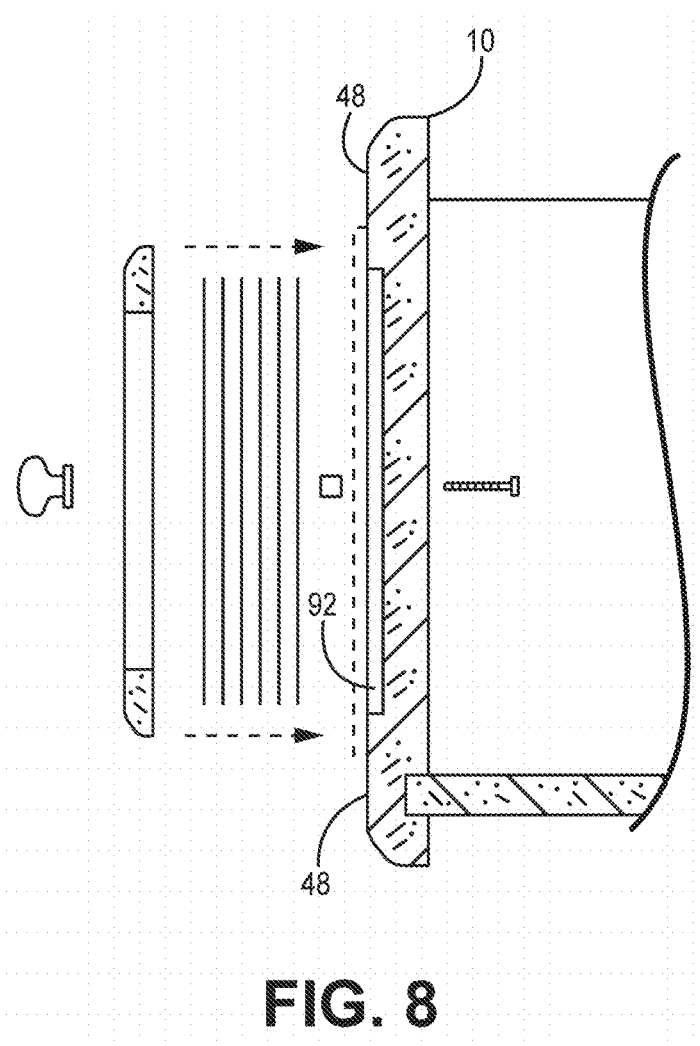
FIG. 8 is an exploded elevational cross sectional view of an embodiment of the invention in the context of a piece of furniture with a drawer.

Referring to FIG. 8, another embodiment utilizes a recess 92 conforming to the size of the panels and a depth corresponding to the thickness of the stack in the mounting surface 48 of the furniture item 10 to receive the stack of panels. Then the overlaying panelar frame lays flush on the surface 48 with the uppermost panel essentially laying flush with the surface 48 as well.

Figure 9:
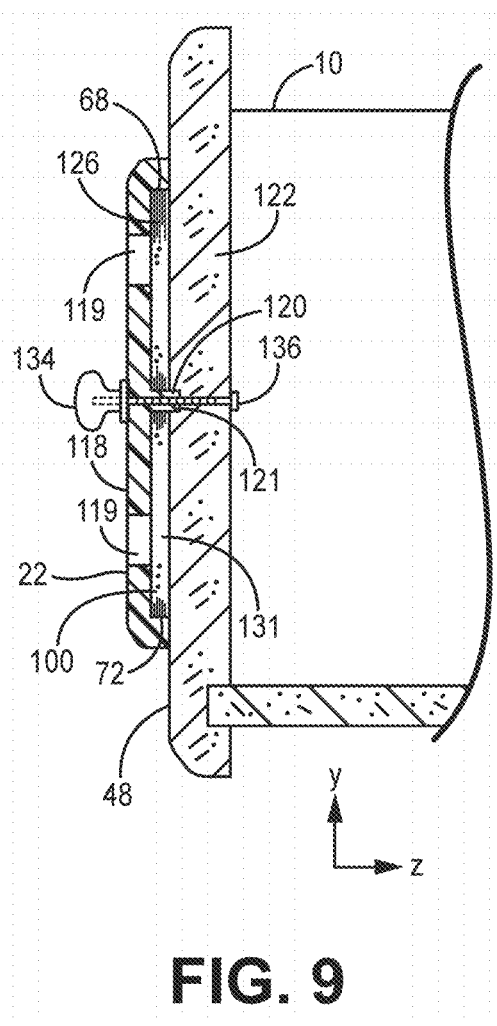
FIG. 9 is an elevational cross sectional view of an embodiment of the invention in the context of a piece of furniture with a drawer.

Referring to FIG. 9, in an embodiment, the overlaying panelar frame 22, may be formed of polymer, for example an injection molded polymer, that has the lattice work 118 on the outside surface formed as part of the molding and defining viewing windows 119. A locating nub 120 can also be part of the molded frame and fit into a cooperating hole 121 in the furniture item panel 122. The stack 126 of decorative panels is constrained on each side of a six sided pocket 131 and is immovable therein with respect to the pocket and mounting surface until the assembly is disassembled by detaching the knob 134 from the bolt 136 or screw.

In other embodiments, there may only be a single panel in the pocket 100, with the depth, in the z direction, of the pocket being less and/or the thickness of the replaceable panel being greater. In embodiments, the overlaying panelar frame constrains the stack in both directions of each of the x, y, and z axis of the x-y-z coordinate system. The panels can be removed only by disassembly, the means of disassembly not obvious by the appearance of the furniture item.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

While the invention is amenable to various modifications and alternative forms, specifics thereof have been shown by way of example in the drawings and described in detail. It is understood, however, that the intention is not to limit the invention to the particular embodiments described. To the contrary, the intention is to cover all modifications, equivalents, and alternatives falling within the spirit and scope of the invention as defined by the appended claims.

I claim:

1. A piece of furniture with a display system, comprising:
    a furniture panel having an exteriorly exposed vertical planar surface extending outwardly from a display area;
    a display frame overlaying the planar surface, the display frame comprising a primary frame and a secondary structure, the primary frame comprising four frame members arranged in a rectangle, the secondary structure connected to and extending from the four frame members, the display frame and the furniture panel defining a six-sided pocket;
    a stack disposed inside the six-sided pocket, the stack comprising a plurality of interchangeable decorative panels, each of the interchangeable decorative panels having two opposing side surfaces and four edges; and
    an elongate fastener extending through the secondary structure and the stack, the elongate fastener removably securing the four frame members to the furniture panel via the secondary structure, the elongate fastener extending in a direction orthogonal to the planar surface of the furniture panel,
    wherein the planar surface extends to four peripheral edges, and wherein the four frame members of the display frame are spaced from the four peripheral edges such that an uncovered portion of the planar surface is exposed between the overlaying display frame and the four peripheral edges.

2. The piece of furniture with a display system of claim 1 further comprising a knob attached to the elongate fastener with the secondary structure and the stack of interchangeable decorative panels disposed between the knob and a head of the fastener, the knob compressing the secondary structure and the stack of interchangeable decorative panels against the furniture panel.

3. The piece of furniture with a display system of claim 1, wherein each of the decorative panels defines an aperture, the apertures in alignment when the decorative panels are in the stack, and wherein the fastener extends through the apertures of the decorative panels.

4. The piece of furniture with a display system of claim 3, wherein each of the interchangeable decorative panels further comprises a plurality of flexible fingers surrounding the aperture defined by the decorative panel, whereby the plurality of flexible fingers flex individually.

5. The piece of furniture with a display system of claim 3, wherein a locating nub is engaged in the collective apertures of the stack of interchangeable decorative panels, the locating nub having a diameter greater than a shaft of the elongate fastener, and the elongate fastener extending through the locating nub.

6. The piece of furniture with a display system of claim 5, wherein the locating nub is unitary with the display frame.

7. The piece of furniture with a display system of claim 1 wherein a second elongate fastener secures the overlaying display frame to the planar surface and the piece of furniture with the display system further comprising a pair of knobs outwardly exposed and each attached respectively to one of the two elongate fasteners.

8. The piece of furniture with a display system of claim 1 wherein the overlaying display frame comprises a locating nub, a portion of the locating nub being received in a cooperating hole defined by the planar surface, the locating nub having a diameter greater than a shaft of the elongate fastener, and the elongate fastener extending through the locating nub.

9. The piece of furniture with a display system of claim 8, wherein the locating nub is unitary with the display frame.

10. The piece of furniture with a display system of claim 1 wherein each frame member defines a recess and the recesses, in combination, capture all four edges of the stack of decorative interchangeable panels.

11. The piece of furniture with a display system of claim 1 wherein the six-sided pocket constrains the stack on six sides whereby the interchangeable decorative panels cannot be removed without first removing the display frame from the planar surface.

12. A piece of furniture with a display system, the piece of furniture comprising a forward facing panel having four peripheral edges defining a rectangular profile and having a planar mounting surface extending between the four peripheral edges, the display system removably mounted to the planar mounting surface with at least one threaded fastener, the display system spaced inwardly on the planar mounting surface from each of the four peripheral edges whereby the planar mounting surface is exposed intermediate each of the four peripheral edges and the display system, the display system comprising a frame defining windows and defining in conjunction with the planar mounting surface a six-sided pocket for receiving decorative panels within the six-sided pocket, wherein the display system projects forwardly from the planar mounting surface of the forward facing panel.

13. A piece of furniture with display system for releasably affixing a stack of interchangeable panels to a vertical mounting surface of a furniture component, comprising:
an overlaying frame mounted to the mounting surface to define a six sided pocket with one side defined by the vertical mounting surface of the furniture component, the mounting surface having a surface area that is larger than a portion covered by the overlaying frame;
an elongated fastener extending from the overlaying frame to the vertical mounting surface to retain the panelar frame to the vertical mounting surface;
a plurality of visually different panels in a stack retained in the six-sided pocket, the stack immovably constrained with respect to the pocket at six sides of the six sided pocket.

14. The display system of claim 13, wherein a knob is attached to the elongated fastener and the knob is engaged with the overlaying frame compressing the overlaying frame against the vertical mounting surface.

15. The display system of claim 13, wherein at least 4 interchangeable panels are stacked and sandwiched between the overlaying frame and the mounting surface, and wherein only an outermost interchangeable panel is visible through the primary opening.

16. The display system of claim 13, wherein the overlaying frame further comprises at least one ornamental frame portion defining a secondary opening, wherein the ornamental frame portion is adapted to engage and retain at least one of a picture and printed image against an inside of the overlaying frame such that a portion of the picture or printed image is visible through the secondary opening.

17. The display system of claim 13, wherein a knob is attached to the elongated fastener and the fastener is a bolt extending entirely through a panel of which the vertical mounted surface is part.

* * * * *